Nov. 30, 1965    G. MAES    3,220,028
RADIO-SONO-BUOYS
Filed Feb. 21, 1963    3 Sheets-Sheet 1

Inventor:
Guy Maes
By Kemon, Palmer,
Stewart & Estabrook
Attorneys

Nov. 30, 1965 G. MAES 3,220,028
RADIO-SONO-BUOYS
Filed Feb. 21, 1963 3 Sheets-Sheet 2
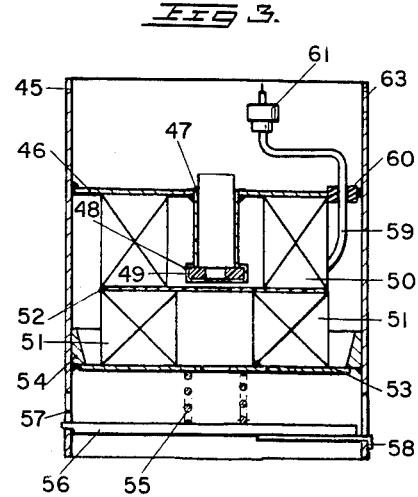
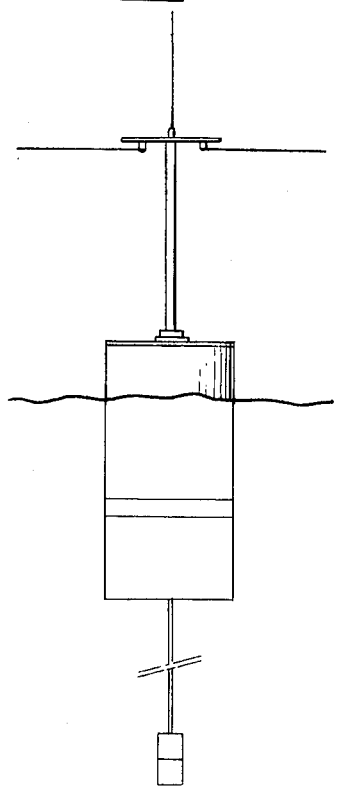
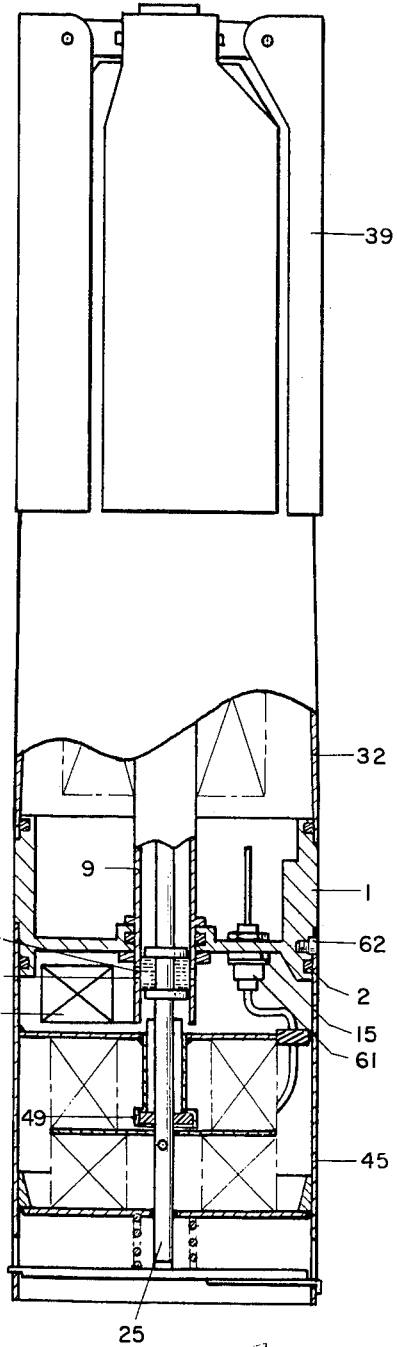
Inventor
Guy Maes
By Kenyon, Palmer,
Stewart & Estabrook
Attorneys

Nov. 30, 1965 G. MAES 3,220,028
RADIO—SONO—BUOYS

Filed Feb. 21, 1963 3 Sheets-Sheet 3

INVENTOR
GUY MAES

BY
*Kenyon, Palmer, Stewart & Eastabrook*
ATTORNEY

United States Patent Office

3,220,028
Patented Nov. 30, 1965

3,220,028
RADIO-SONO-BUOYS
Guy Maes, Neuilly-sur-Seine, France, assignor to
L'Electronique Appliquee, Paris, France
Filed Feb. 21, 1963, Ser. No. 260,110
Claims priority, application France, Mar. 10, 1962,
890,648, Patent 1,324,433
4 Claims. (Cl. 9—8)

The present invention concerns improvements in or relating to radio-sono-buoys adapted to be thrown into the sea from aircraft and surface ships, the impact of the buoy on the water controlling both the erection of an aerial and the activation of salt water batteries. An aerial is initially housed within the body of the buoy and the batteries are initially protected against moisture.

It is an object of the invention to provide a radio-sono-buoy which has a high degree of security of the initiating conditions at its impact on the sea and in which the quality of transmission of the signals is high even when the sea is rough.

It is another object of the invention to provide a radio-sono-buoy in which the assembly, stocking and handling thereof is greatly facilitated.

According to a feature of the invention, the buoy is mainly characterized by the combination of two sub-assemblies adapted to be mounted one above the other after each one of them has been separately assembled and tested. The upper sub-assembly comprises a float and incorporates a central rigid tube housing an erectable aerial during stocking and handling conditions. The electric equipment is carried within a watertight casing and the salt water batteries are supported under the lower wall of the casing. The lower sub-assembly comprises a tubular open-ended casing, housing at least one hydrophone and the cable therefor, means for initiating the erection of said aerial, means for activation of the batteries and means for releasing the hydrophone and cable at the impact of the buoy on the water. The upper sub-assembly is also provided with a self-rotating fall-damping device which is folded around its upper part during stocking and handling conditions. This device is automatically operated during the fall of the buoy and is self-detaching in response to the impact of the buoy on the sea.

These and other features will be described in detail with reference to the accompanying drawings, wherein:

FIG. 3 shows a cross-sectional view of a preferred embodiment of the lower sub-assembly;

FIG. 4 shows a view, partly in cross-section, of the complete assembly of the buoy in stocking and handling condition;

FIG. 6 is an enlarged sectional view of a portion of the buoy shown in FIG. 2.

Figure 1:
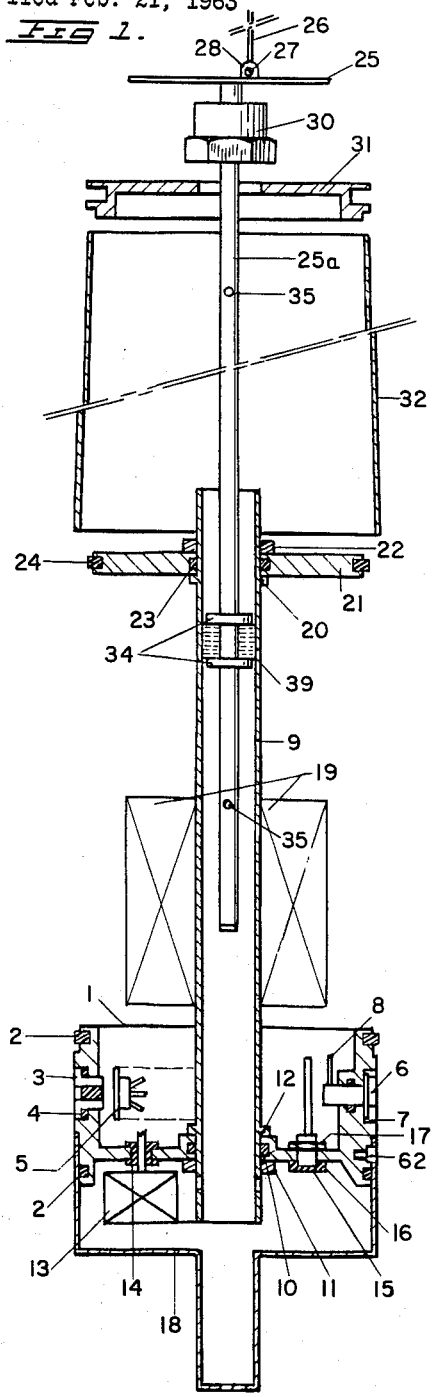
FIG. 1 shows a cross-section elevation view of a preferred embodiment of the upper sub-assembly of a radio-sono-buoy according to the invention, prior to the closing of said sub-assembly by a tubular casing.

Referring first to FIG. 1, the buoy supporting tube 9 passes through a base member 1. A plastic joint 10 ensures the watertightness of the assembly and a nut 11, screwed on the tube 9, secures the base member against a shoulder 12 on said tube 9. The lower end of the tube constitutes the carrier member for a group of salt water activated batteries 13, secured to the tube by any suitable means. The output wires from the batteries 13 pass through watertight passages 14 through the wall of the base member 1. A water-tight plug 15 equipped with a joint 16 is secured by the nut 17 on the said wall permitting connection of the end of the hydrophone cable to the electric equipment 19 carried by the tube 9. This equipment is not otherwise shown and comprises sonic and radioelectric apparatus formed, for instance, on a plurality of plates equipped with the necessary wiring and circuit components and said plates are secured to said tube 9.

A disc-shaped plate 21 is secured by means of a nut 22 on a shoulder 20 at the upper end of tube 9.

A joint 23 ensures the watertightness of the assembly of the plate 21 and the tube 9.

Figure 2:
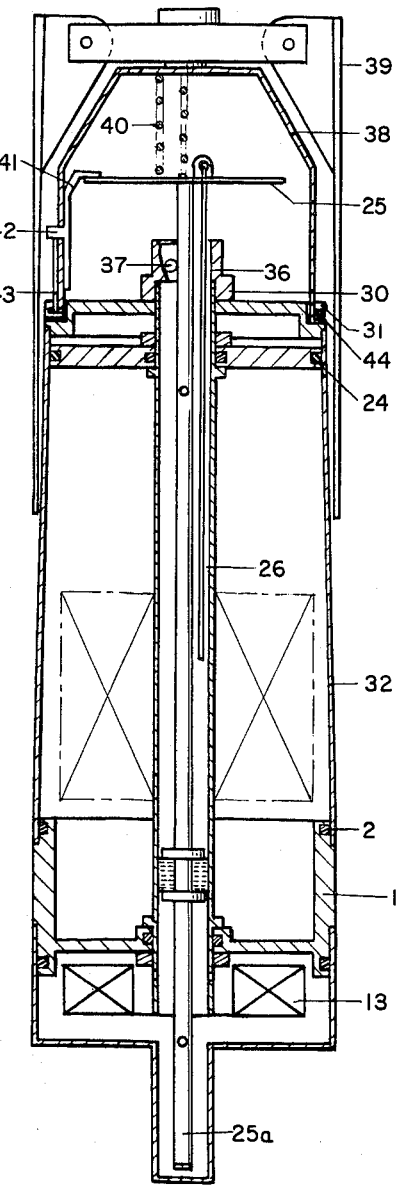
FIG. 2 is a view similar to FIGURE 1 but with the upper sub-assembly within a casing, in a form adapted for assembling with the lower sub-assembly.
Figure 5:
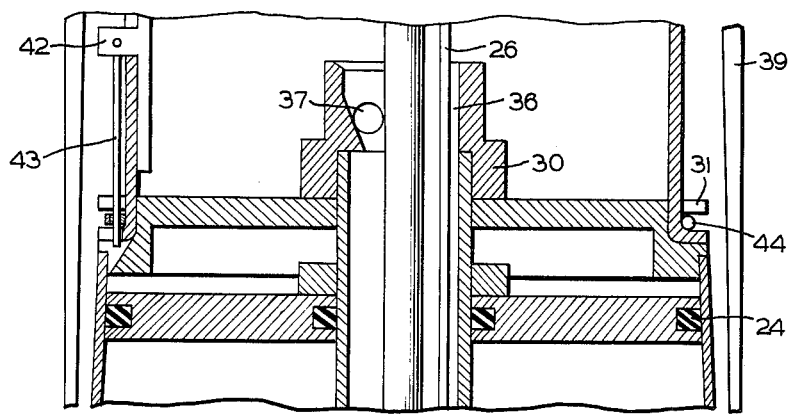
FIG. 5 shows a sketch of the buoy afloat.

Referring to FIG. 2, a casing 32 is used as a closure for the upper sub-assembly and provides a float for the complete buoy. Watertightness is ensured by the annular joints 24 of the plate and the base member to the casing 32. A washer 31 and nut 30 secure the casing 32 on the upper end of the tube 9.

An aerial 26 pivoted on an axle 27 carried on a disc plate 25 has been folded downward against the pressure of a spring 28 urging the erection thereof, FIG. 1, and has been introduced within the tube 9, FIG. 2, along the rod 25a which carries the disc 25. The entire assembly including the rod 25a, antenna 26 and disc 25 is biased downwardly by a spring 40 positioned between the upper inner wall of a cup-shaped member 38 and the disc 25. A ball 37 is serrated between the aerial carrier rod 25a and the nut 30.

The cup-shaped member 38 is provided for supporting a self-rotating arrangement of blades 39 which are folded against the wall of the upper assembly. The member 38 is provided with a moving finger 41 the upper end of which overlies the disc 24 and a portion 42 of which engages a trigger rod 43 engaged in holes of a guard-ring 44 of the cup as may be seen in more detail by reference to FIG. 6 of the drawings, the ring 44 is interposed between an outwardly extending flange on the cup-shaped member 38 and a protruding portion of the washer 31. The ends of the ring 44 are flattened and superimposed over one another as may be seen at the left-hand side of FIG. 6, and are provided with superimposed holes through which the trigger rod 43 is disposed. The ring is also formed so that, in its relaxed condition, it assumes a non-circular open shape so that upon removal of the trigger rod 43 the ring will spring outwardly.

The aerial carrier rod 25a is hollow and is provided with holes 35. It is further provided near its lower end with a pair of spaced discs 34 between which has been introduced a joint packing 33 of low friction material, such for example as greased felt. This renders watertight the passage from the tube 9 to the aerial carrier 25.

During the stocking and handling periods, a watertight casing 18 is placed on the lower end of the member 1 to keep the salt water batteries dry.

For testing and adjusting the sub-assembly of FIG. 1, the cup 38 is not mounted. The nut 30 is unscrewed and the aerial carrier rod 25a is pulled up, the casing 32 being also pulled upwards. The water tightness of the battery compartment may be maintained by a temporary plug placed in the upper hole 35 of the aerial carrier. The electric equipment is consequently fully available. The base member 1 further carries a plug 3 clamping a joint 4. This plug has been used for a previous check of watertightness of the float in the condition shown in FIG. 2. In the condition of FIG. 1, the removal of the plug 3 further makes available an electric plug for making electric checks and measures. The position of said electric plug permits the connection to the various parts of the electric equipment with a minimum length of electric cable, once the plug 3 is replaced by a connector. A selector handswitch 6 enables the drive of a circuit selector (unshown) for the adjustments which may be needed. The watertightness of 6 is ensured by means of a joint 7.

Such a design of the upper sub-assembly consequently enables the mounting, adjustment and replacement of any and all electrical parts without necessitating a disassembly of the mechanical parts thereof. Further to the simplicity and subsequent security, it enables the use of a relatively long aerial so that once the buoy is afloat, the aerial will neatly come out of the body of the buoy and enhance the quality of the radiotransmission even with a rough sea.

The lower sub-assembly is made as shown on the elevation cross-sectional view of FIG. 3. The body of said lower sub-assembly is made of a metallic tube 45 wherein is secured a watertight partition 46 with a central tube 47 passing therethrough. The diameter of tube 47 is less than the diameter of tube 9 of the upper sub-assembly. The structural connection of the members 45, 46, 47 may be ensured by soldering or brazing. The enlarged lower end of tube 47 defines a housing 48 in which is placed a joint packing 49.

The hydrophone cable 59 and the hydrophone elements 51, separated by a washer 52 protecting the cable coil, are pressed between the partition 46 and a plate 53 applied against a ring 54 affixed within the tube 45 by a spring 55. Said spring 55 is supported in the tube 45 by means of a plate 56 one end of which engages an orifice 57 of the tube 45 and the other end of which is blocked by a latch or key 58 inserted through a second orifice 57. In such an arrangement, the spring 55 locks the components in the lower part of the buoy. The free end of the hydrophone cable 59 passes through the wall 46 by an airtight joint 60 and ends in a connector 61 which can be plugged in the socket 15 of the upper part of the buoy.

For mounting the two sub-assemblies together, it is only necessary to remove the screws 62 and remove the stockage casing 18 from the base member 1 of the upper sub-assembly. Then, after plugging the connector 61 into the socket 15, the tube 45 of the lower sub-assembly is pushed around the base member 1 of the upper sub-assembly and the screws 62 are replaced for securing the two members. The aerial carrier rod 25a has come within the joint 49 so that a temporary watertightness is obtained for the battery compartment. The holes in tube 9 are masked by joint packing 33. The buoy can consequently be stocked without any risk of deterioration of the batteries.

The operation may now be explained as follows: The impact of the buoy on the water produces a pressure on 56 moving this member upwardly against the pressure of the spring 55 and freeing the key 58. The key then falls from the orifice 57 locking the member 25. The aerial carrier rod 25a is simultaneously pressed upwards by movement of member 25. The disc-shaped member 25, affixed to 25a, drives the arrangement 41–42–43 which withdraws the trigger rod 43 from the holes in the end of the guardring 44 thereby allowing the guardring to spring open and unblock the cup member 38. The cup and the self-rotating blade arrangement carried by said cup are ejected by the action of the spring 40. From the resistance of water to penetration, the disc-shaped member 25, of low weight, is slowed down whereas, on the other hand, the body of the buoy driven by its kinetic energy continues to go downward in the water at a relatively high speed. This difference of speeds ensures the extraction of the aerial carrier rod 25a from the tube 9 and the upper part 34 of said carrier abuts against the nut 30. The aerial 26 erects under the urge of the spring 28 and the resistance of the water. Further, the upward movement of the aerial carrier rod 25a results in disengagement with the joint 49 and the compartment of the salt water batteries is no more watertight. When the slowing down of the speed of the buoy is sufficient for rendering the pressure of the spring 55 higher than the water pressure on 56, the hydrophone 51 and its cable coil 50 fall, pressing away the parts 52, 53, 55 and 56. The cable coil unwinds and the water enters the battery compartment through the tube 47. The batteries 13 are activated and the produced gases escape through the orifices 64 in the tube 9 and orifices 35 of the aerial carrier rod 25a during the operation of the transmitter buoy.

While a preferred embodiment of the present invention has been herein shown and described, applicant claims the benefit of a full range of equivalents within the scope of the appended claims.

I claim:
1. A radio-sono-buoy comprising:
   (1) an elongated hollow tube, a rod slidable in said tube and protruding from the lower end thereof;
   (2) an antenna structure removably supported within said tube on the upper end of said rod and means to erect said antenna with respect to said rod upon removal thereof from said tube;
   (3) a first sub-assembly at the lower end of said tube proximate the protruding portion of said rod, said first sub-assembly including a housing having a hydrophone and connecting cable releasably mounted therein;
   (4) a second sub-assembly on said tube adjoining said first sub-assembly including a permanently sealed water tight float chamber surrounding said tube and enclosing radio equipment for the buoy therein;
   (5) a chamber which is temporarily watertight surrounding the protruding portion of said rod, said chamber enclosing water activatable batteries therein;
   (6) and an impact responsive trigger means operative upon impact of the buoy with the sea to drive said rod upward within said tube and to release said hydrophone, means movable with said rod to admit sea water to said batteries upon displacement of said rod, and to release said antenna from said tube.

2. The combination defined by claim 1 and further including: a self-rotating plural blade device temporarily folded about the upper portion of said second subassembly, and means responsive to said impact responsive trigger for detaching said device upon impact of the buoy with the sea.

3. A buoy as defined by claim 1 in which said temporarily watertight chamber housing the batteries is positioned between said subassemblies.

4. A buoy as defined by claim 1 in which when said buoy is in operative position, said second subassembly is positioned above said first subassembly.

References Cited by the Examiner

UNITED STATES PATENTS

| | | | |
|---|---|---|---|
| 2,395,252 | 2/1946 | Carpenter | 9—8 |
| 2,586,828 | 2/1952 | Keeran | 9—8 |
| 3,093,808 | 6/1963 | Tatnall et al. | 9—8 X |

FOREIGN PATENTS

| | | |
|---|---|---|
| 1,226,674 | 2/1960 | France. |
| 1,228,001 | 3/1960 | France. |
| 1,241,849 | 8/1960 | France. |

FERGUS S. MIDDLETON, *Primary Examiner.*